(12) United States Patent
Nishiki

(10) Patent No.: US 6,183,918 B1
(45) Date of Patent: Feb. 6, 2001

(54) ALIGNMENT METHOD AND SYSTEM FOR USE IN MANUFACTURING AN OPTICAL FILTER

(75) Inventor: Akihiko Nishiki, Tokyo (JP)

(73) Assignee: Oki Electric Industry Co., Ltd., Tokyo (JP)

( * ) Notice: Under 35 U.S.C. 154(b), the term of this patent shall be extended for 0 days.

(21) Appl. No.: 09/481,499

(22) Filed: Jan. 12, 2000

Related U.S. Application Data

(63) Continuation-in-part of application No. 09/149,120, filed on Sep. 9, 1998, now Pat. No. 6,038,358.

(30) Foreign Application Priority Data

Nov. 12, 1997 (JP) ..................................................... 9-310915

(51) Int. Cl.⁷ ................. G03F 9/00; G02B 6/34
(52) U.S. Cl. ............................ 430/22; 430/30; 359/569; 385/37; 385/123
(58) Field of Search ..................... 430/22, 30; 385/37, 385/123; 359/569

(56) References Cited

U.S. PATENT DOCUMENTS

| | | | |
|---|---|---|---|
| 5,367,588 | 11/1994 | Hill et al. | 385/37 |
| 5,604,827 | 2/1997 | Bruesselbach | 385/37 |
| 5,619,603 | 4/1997 | Epnorth et al. | 385/37 |
| 5,652,818 | 7/1997 | Byron | 385/37 |
| 5,818,988 | 10/1998 | Modavis | 385/37 |
| 6,038,358 | * 3/2000 | Nishiki | 385/37 |

OTHER PUBLICATIONS

Inoue et al., Fiber Bragg grating and its applications, Oyo Butsuri, vol. 66, No. 1, 1997, pp. 33–36.

Anderson et al., "Production of in–fibre gratings using a diffractive optical element", Electronics Letters, vol. 29, No. 6, Mar. 18, 1993, pp. 566–568.

Komukai et al., "Fabrication of high–quality fiber gratings by the fluorescene monitoring method", Ninth Meeting on Applied Fiber Optic Technology, pp. 1–4.

* cited by examiner

*Primary Examiner*—Christopher G. Young
(74) *Attorney, Agent, or Firm*—Venable; Robert J. Frank; Michael A. Sartori

(57) ABSTRACT

A photosensitive optical fiber being scanned by an ultraviolet beam to form an optical filter is aligned with the beam by detecting fluorescence produced in the fiber. The relative position of the fiber and beam is made to oscillate in a direction cutting across the scanning direction. Misalignment is corrected according to the phase relationship between the fluorescence detection signal and the oscillation, permitting the alignment to be controlled accurately regardless of the beam dimensions, scanning distance, scanning rate, and natural fluorescence variations.

18 Claims, 8 Drawing Sheets

ALIGNMENT METHOD AND SYSTEM FOR USE IN MANUFACTURING AN OPTICAL FILTER

This application is a Continuation-In_Part of application Ser. No.09/149,120, filed Sep. 9, 1998 now U.S. Pat. No. 6,038,358.

BACKGROUND OF THE INVENTION

The present invention relates to a method and system for aligning an ultraviolet beam and an optical fiber during the manufacture of an optical filter in the optical fiber.

Optical filters comprising Bragg gratings formed in optical fibers are useful for dispersion compensation in optical communication systems, and for various other applications. A known method of manufacturing such filters illuminates a photosensitive optical fiber with ultraviolet light through a phase mask, thereby imprinting a modulation pattern in the refractive index of the fiber core. The manufacturing process is difficult, because the optical characteristics of the filter are extremely sensitive to the degree of index modulation. Unintended variations in the degree of index modulation can cause Fabry-Perot resonance and undesired chirping, leading to such problems as ripple in the reflection band, generally reduced reflectivity in the reflection band, and prominent sidelobes outside the reflection band.

The filter characteristics also depend on the length of the in-fiber Bragg grating, and some applications require fairly long gratings. Dispersion compensation on the order of one thousand four hundred picoseconds per nanometer over a bandwidth of seven nanometers, for example, requires an in-fiber Bragg grating with a length of one to two meters.

Since the degree of index modulation depends on the amount of ultraviolet illumination received by the fiber core, highly uniform illumination is a key consideration in the manufacturing process. The source of the ultraviolet light is a laser apparatus. Uniform illumination requires the use of a highly stable source, such as an argon ion laser, which emits a comparatively weak and narrow ultraviolet beam by second harmonic generation. (The comparison is with a krypton-fluoride or KrF laser. A KrF laser emits a larger and stronger beam, but the beam intensity and plane of polarization tend to fluctuate over time.) The intensity of an argon ion laser beam can be increased by focusing the beam, but the beam then becomes even narrower. This narrow beam must be scanned along the length of the optical fiber, and for uniform illumination, the center of the beam must be kept accurately aligned on the fiber core throughout the scan. Accurate alignment of a narrow beam on a thin optical fiber is no simple matter, particularly when a long in-fiber grating is being manufactured.

A known method of alignment is to monitor visible light produced by fluorescence when the core of the optical fiber is illuminated by the ultraviolet beam. The fluorescence arises from the germanium doping that makes the core photosensitive. The fluorescence is measured by an optical power meter connected to one end of the optical fiber, and the measured value is fed back to a positioning system that positions the fiber under the beam. The feedback control system operates to keep the fiber in the position that produces maximum fluorescence, this being the position in which the beam is centered on the fiber core.

This fluorescence monitoring method of alignment leaves room for improvement, however, because while a decrease in the measured optical power may indicate that the beam is drifting away from the fiber axis, the decrease does not indicate the direction of the drift. The positioning system must move the fiber in one direction, and determine whether this movement produces an increase or a further decrease in the measured optical power. If a further decrease is detected, then the positioning system has moved the fiber in the wrong direction, and must now move the fiber in the opposite direction.

Natural variations in the amount of fluorescence also make it difficult to determine when the maximum optical power has been obtained. Even when the ultraviolet beam is held stationary on the same spot on the optical fiber, the intensity of the fluorescence varies considerably over time, not reaching a constant level until about thirty seconds have elapsed. One consequence is that the measured optical power depends on the scanning rate, which may be varied intentionally to create an apodized Bragg grating.

For these reasons, a feedback control system targeted at maximum fluorescence requires complex control circuitry. Moreover, even with complex control circuitry, the beam alignment has a tendency to wander, due to natural fluorescence variations and wrong-direction control. With a sufficiently wide beam, such wandering could be tolerated, but the optical filter manufacturer would prefer to be able to focus the beam as tightly as possible, thereby making the beam as intense as possible, so that the scanning process can be completed as quickly as possible.

SUMMARY OF THE INVENTION

An object of the present invention is to maintain accurate alignment between a photosensitive optical fiber and an ultraviolet beam, without unnecessary wandering of alignment, while the ultraviolet beam is scanned along the optical fiber to create an optical filter in the optical fiber.

Another object of the invention is to maintain accurate alignment between a photosensitive optical fiber and a tightly focused ultraviolet beam.

Another object is to provide a simple control circuit for maintaining accurate alignment between a photosensitive optical fiber and an ultraviolet beam.

The invented alignment method comprises the steps of:
producing an oscillation in relative position between the photosensitive optical fiber and the ultraviolet beam in a direction differing from the scanning direction;
detecting light produced by fluorescence in the photosensitive optical fiber;
converting the detected light to a first signal having an oscillating component due to the above-mentioned oscillation in relative position;
detecting the phase relationship between the first signal and the oscillation in relative position; and
adjusting the relative position of the photosensitive optical fiber and ultraviolet beam according to the detected phase relationship.

According to a first aspect of the invention, the oscillation in relative position is produced by vibrating the photosensitive optical fiber. According to a second aspect of the invention, the oscillation is produced by tilting a mirror that reflects the ultraviolet beam.

The oscillating component of the first signal is preferably compared with a threshold to generate a binary signal, and the phase relationship is preferably detected by comparing the binary signal with a second signal that is used to produce the oscillation in relative position. The relative position of the photosensitive optical fiber and ultraviolet beam is not adjusted when the oscillating component of the first signal remains below the threshold.

The invented alignment system comprises a positional transducer for producing the oscillation in relative position, an optical transducer for converting the light produced by fluorescence to the first signal, and a control circuit for comparing the phase of the first signal with the phase of the oscillation in relative position and adjusting the relative position of the photosensitive optical fiber and ultraviolet beam. The positional transducer may be piezoelectrically actuated.

DETAILED DESCRIPTION OF THE INVENTION

Embodiments of the invention will be described with reference to the attached illustrative drawings, following a general description of the conventional method of using a phase mask to create an in-fiber Bragg grating.

Figure 1:
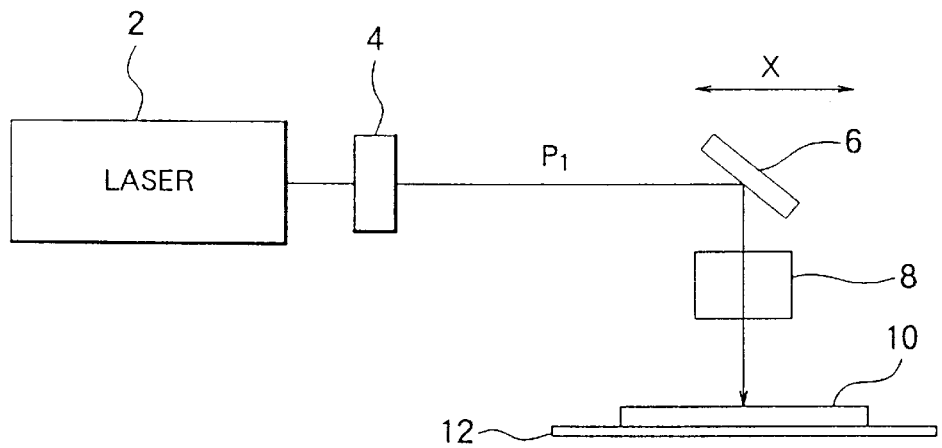
FIG. 1 is a schematic drawing of a conventional apparatus for manufacturing an in-fiber Bragg grating.

FIG. 1 shows a conventional apparatus comprising a laser light source 2, an optical attenuator 4, a mirror 6, and a cylindrical lens 8 that focuses an ultraviolet beam P1, through a phase mask 10 onto a photosensitive optical fiber 12. The mirror 6 and cylindrical lens 8 are movable in the direction of arrow X, this motion causing the ultraviolet beam to scan the photosensitive optical fiber 12 in the lengthwise direction. The optical attenuator 4 is necessary if a high-intensity laser light source is used, but may be omitted if a lower-intensity source such as an argon ion laser is used.

Figure 2:
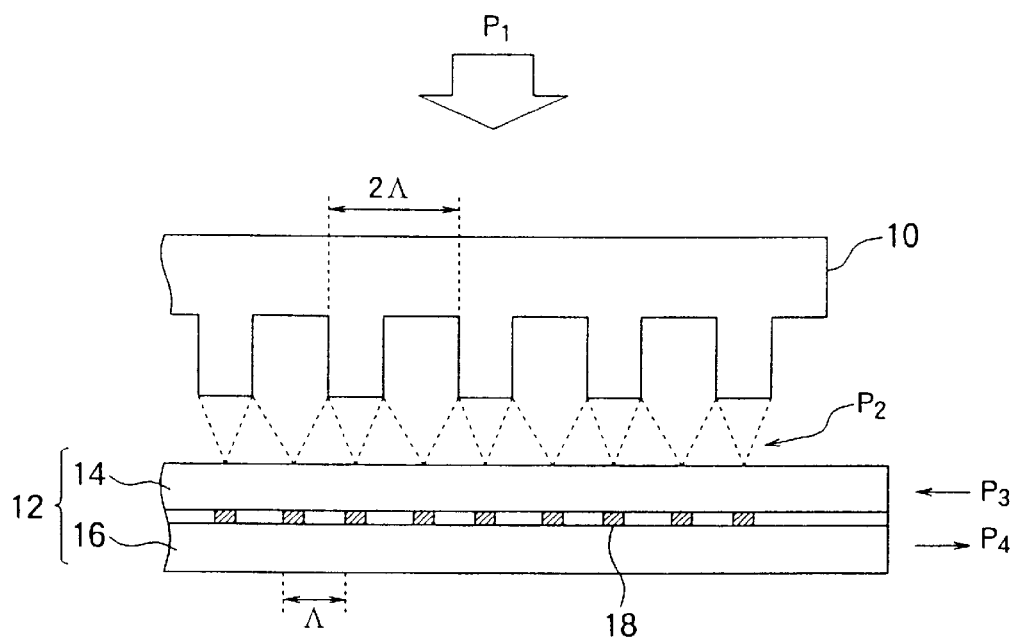
FIG. 2 is an enlarged sectional view of the phase mask and photosensitive optical fiber in FIG. 1.

Referring to FIG. 2, the photosensitive optical fiber 12 comprises a clad 14 and a photosensitive core 16. The core 16 is doped with germanium, so that its refractive index is alterable by exposure to ultraviolet light. The core may also be doped with hydrogen. The SMF-28 fiber manufactured by Corning, Incorporated, of Corning, N.Y., is an example of a suitable photosensitive optical fiber.

The lower surface of the phase mask 10 has a pattern of parallel corrugations forming a diffraction grating. The phase mask 10 can be fabricated by reactive ion etching of a silica glass substrate, using a thin-film chromium mask patterned by electron-beam photolithography.

Diffraction of the ultraviolet beam $P_1$ by the phase mask 10 produces a diffracted ultraviolet beam $P_2$ that illuminates the photosensitive optical fiber 12. If the grating pitch of the phase mask 10 is 2Λ, then the diffracted ultraviolet beam $P_2$ alternates between high and low intensity with a period of Λ. The refractive index of the fiber core 16 is most greatly altered in regions 18 exposed to the high-intensity parts of the diffracted ultraviolet beam $P_2$. A Bragg grating with a grating pitch of Λ is thus created in the fiber core 16.

The Bragg grating selectively reflects light with a wavelength $\lambda_b$ given by the following formula, in which $n_{eff}$ is the effective refractive index of the fiber core 16.

$$\lambda_b = 2 \cdot n_{eff} \cdot \Lambda$$

If light $P_3$ with a plurality of wavelengths, including $\lambda_b$, is directed into the photosensitive optical fiber 12 from one end, the light $P_4$ of wavelength $\lambda_b$ is reflected back to the same end. The photosensitive optical fiber 12 thus becomes a filter that extracts a particular wavelength $\lambda_b$.

Figure 3:
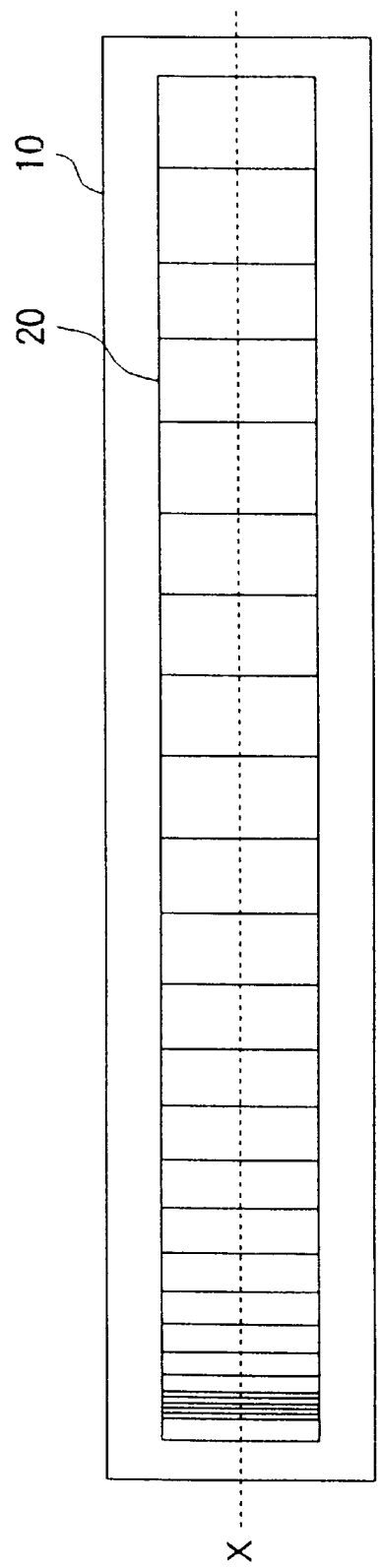
FIG. 3 is an enlarged plan view of the phase mask in FIG. 1.

Referring to FIG. 3, the phase mask 10 may have a chirped grating 20 with a grating pitch that varies, either continuously or in discrete steps. The grating 20 can be divided into zones, for example, and a different grating pitch employed in each zone, to create a filter that extracts a plurality of wavelengths.

Figure 4:
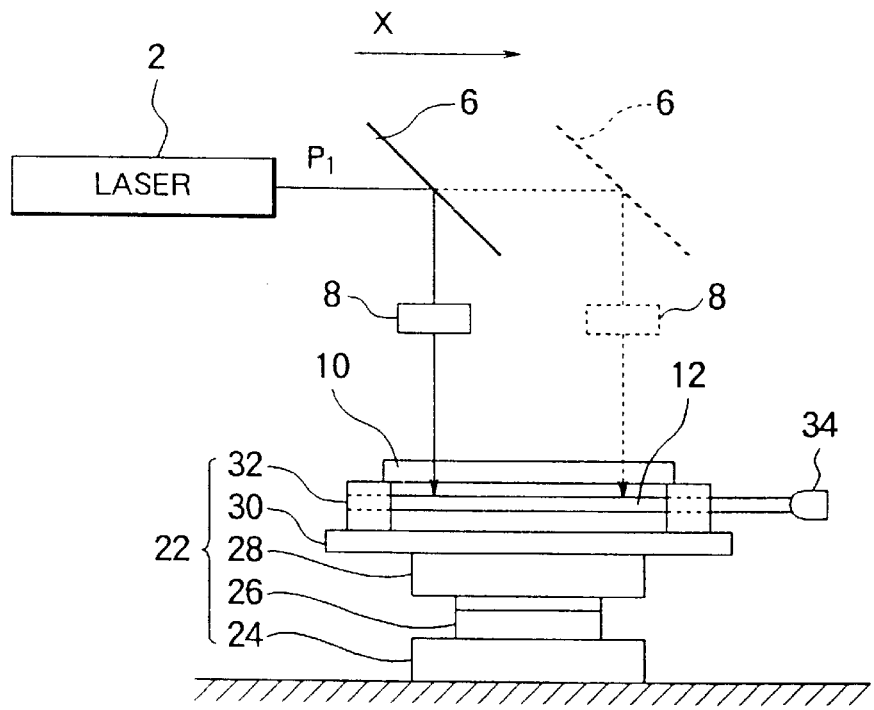
FIG. 4 is a side view illustrating mechanical components of an alignment system according to a first embodiment of the invention.

FIG. 4 illustrates an apparatus generally similar to the above, but employing a first embodiment of the invention for alignment of the ultraviolet beam and the optical fiber. The laser light source 2 is a continuous-wave argon ion laser such as the INNOVA 300 FRED laser manufactured by Coherent, Incorporated, of Santa Clara, Calif. The width of the ultraviolet beam P1 is, for example, six-tenths of a millimeter (0.6 mm). The mirror 6 and cylindrical lens 8 move in the direction indicated by arrow X. By focusing the ultraviolet beam, the cylindrical lens 8 reduces the beam width to substantially one hundred micrometers (100 μm) and increases the beam intensity proportionately. The phase mask 10 may have either a constant or a chirped grating pitch; a constant grating pitch will be assumed in the following description. The above-mentioned Corning SMF-28 fiber may be employed as the photosensitive optical fiber 12, or any other type of photosensitive optical fiber may be used, provided the fiber core fluoresces when illuminated by ultraviolet light.

The phase mask 10 and photosensitive optical fiber 12 are secured to a Y-θ stage assembly 22 comprising a Y-axis translational stage 24, a θ-axis rotational stage 26, a Y-axis vibrating stage 28, a base plate 30, and a pair of fiber holders 32. The Y-axis translational stage 24 is driven by a stepping motor (not visible) in a Y-axis direction perpendicular to the drawing sheet. The θ-axis rotational stage 26 is driven by another stepping motor (not visible), the axis of rotation being vertical in the drawing. The Y-axis vibrating stage 28 is vibrated by a piezoelectric transducer (not visible) in the Y-axis direction. The base plate 30 supports the fiber holders 32, which hold the phase mask 10 and photosensitive optical fiber 12. The photosensitive optical fiber 12 is held suspended above the base plate 30, so that the refractive index of the fiber core is not significantly affected by ultraviolet light reflected from the base plate 30. The phase mask 10 is held parallel to the photosensitive optical fiber 12.

One end of the photosensitive optical fiber 12 is coupled to an optical transducer 34 that converts visible light received from the photosensitive optical fiber 12 to a direct-current or dc voltage signal having a voltage level responsive to the intensity of the visible light. The optical transducer 34 is supported by a separate holder (not visible). A suitable optical transducer is the Model 8235-C optical power meter manufactured by the Newport Corporation of Irvine, Calif.

Figure 5:
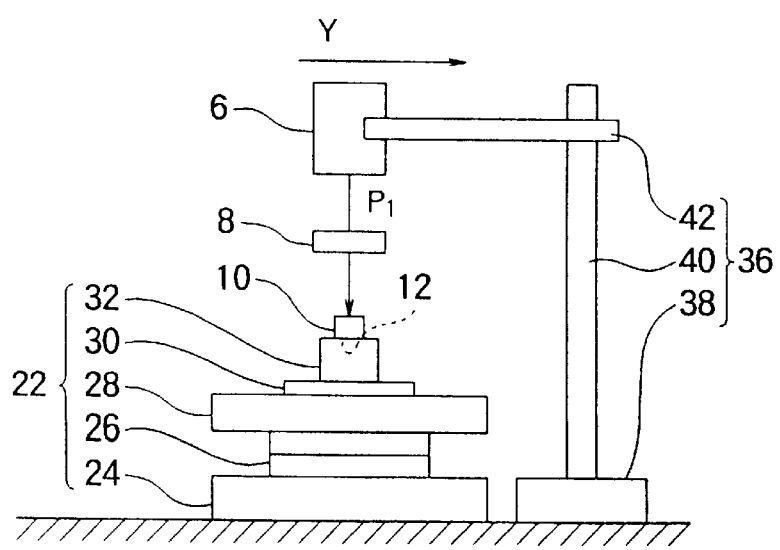
FIG. 5 is a frontal view illustrating the mechanical components in the first embodiment.

Referring to FIG. 5, the apparatus also has an X-axis stage assembly 36 comprising an X-axis translational stage 38, a vertical column 40, and a horizontal arm 42 attached to the vertical column 40. The horizontal arm 42 supports the mirror 6 and cylindrical lens 8 (the physical attachment between the cylindrical lens 8 and horizontal arm 42 is omitted to simplify the drawing). The X-axis translational stage 38 moves the vertical column 40 and horizontal arm 42, thereby producing the scanning motion indicated by the arrow X in FIG. 4. The scanning rate is in the range from, for example, ten millimeters to one hundred millimeters per second (10 mm/s to 100 mm/s).

Figure 6:
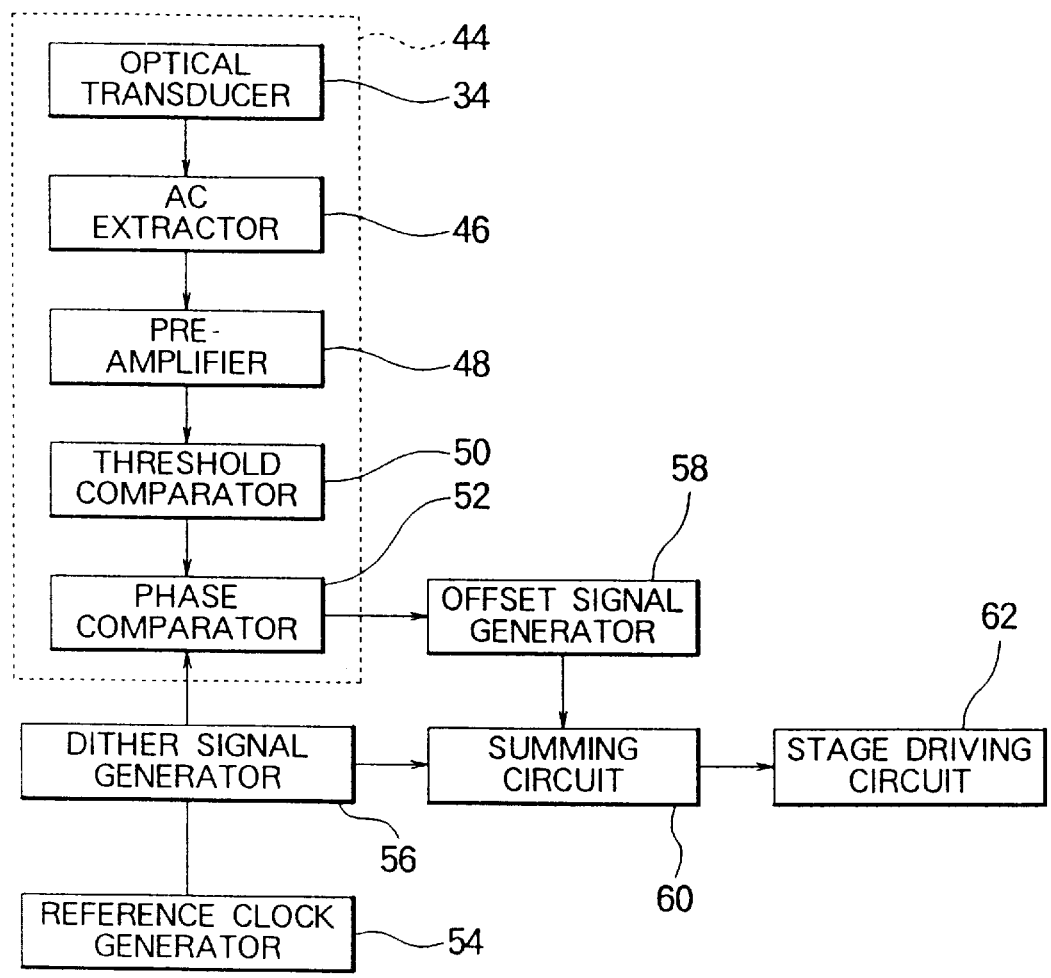
FIG. 6 is a block diagram of the control circuit in the first embodiment.

Referring to FIG. 6, the optical transducer 34 is part of a misalignment detection circuit 44 that also comprises an alternating-current or ac extractor 46, a pre-amplifier 48, a threshold comparator 50, and a phase comparator 52. The ac extractor 46 extracts the oscillating or ac component of the output of the optical transducer 34 by, for example, subtracting the dc component. The ac component is amplified by the pre-amplifier 48, then compared with a positive threshold voltage by the threshold comparator 50. The threshold comparator 50 outputs a binary signal that is high when the instantaneous voltage level of the amplified ac component exceeds the threshold, and low when the instantaneous voltage level of the amplified ac component is less than the threshold.

As additional control circuitry, the first embodiment has a reference clock generator 54, a dither signal generator 56, an offset signal generator 58, a summing circuit 60, and a stage driving circuit 62. The reference clock generator 54 generates a reference clock signal with a constant frequency. The dither signal generator 56 divides this frequency to create a dither signal, which is an oscillating signal that alternates between the high and low levels. The dither signal is supplied to the phase comparator 52 and summing circuit 60.

The phase comparator 52 outputs a phase-comparison signal that indicates the phase relationship between the binary signal received from the threshold comparator 50 and the dither signal received from the dither signal generator. The phase-comparison signal is, for example, a pulse signal with a duty cycle that depends on the phase relationship.

The offset signal generator 58 receives the phase-comparison signal from the phase comparator 52, and outputs a dc offset voltage signal. When the phase-comparison signal indicates that the binary signal is in phase with the dither signal, the offset signal generator 58 increases the dc offset voltage. When the phase-comparison signal indicates that the binary signal and dither signal have mutually reverse phases, the offset signal generator 58 decreases the dc offset voltage.

The summing circuit 60 adds the dc offset voltage output by the offset signal generator 58 to the dither signal output by the dither signal generator 56 to create a compensation signal, which is supplied to the stage driving circuit 62. The stage driving circuit 62 drives the piezoelectric transducer in the Y-axis vibrating stage 28 according to the value of this compensation signal. The output of the stage driving circuit 62 is a voltage signal with a variable range of, for example, ten volts (10 V), which is converted by the piezoelectric transducer to a positional displacement with a variable range of, for example one hundred micrometers (100 $\mu$m). The peak-to-peak oscillation of the output of the stage driving circuit 62 is, for example, a few tenths of a volt, which the piezoelectric transducer converts to a vibration of a few micrometers.

The control circuit shown in FIG. 6 is concerned with alignment control during the scanning process. For initial alignment, and for control of the scanning process itself, the X-axis translational stage 38, Y-axis translational stage 24, and θ-axis rotational stage 26 are controlled by a conventional computer system, not shown in the drawings.

The operation of the first embodiment will now be described with reference to the preceding figures and FIGS. 7 to 11.

To begin the manufacture of an optical filter, the phase mask 10 and photosensitive optical fiber 12 are secured to the fiber holders 32 so that the photosensitive optical fiber 12 is aligned with the long axis of the phase mask 10 (the dashed line in FIG. 3). Conventional methods are then used to adjust the Y-axis translational stage 24 and θ-axis rotational stage 26 to initial positions in which the photosensitive optical fiber 12 is aligned with the X-axis or scanning axis in FIG. 4, and is substantially centered under the path of the ultraviolet beam $P_1$. Next, the stage driving circuit 62 is switched on, causing the Y-axis vibrating stage 28 to vibrate the base plate 30 in the Y-axis direction. If necessary, the Y-axis translational stage 24 is readjusted so that the vibration is centered under the path of the beam.

Next, the X-axis stage assembly 36 begins moving the mirror 6 and cylindrical lens 8 along the X-axis under computer control, causing the ultraviolet beam $P_1$ to move along the long axis of the phase mask 10, and the diffracted ultraviolet beam $P_2$ to scan along the length of the photosensitive optical fiber 12. During the scan, the Y-axis vibrating stage 28 acts as a positional transducer that produces an oscillation in the relative position of the photosensitive optical fiber 12 and diffracted ultraviolet beam $P_2$, in the Y-axis direction.

Figure 7:
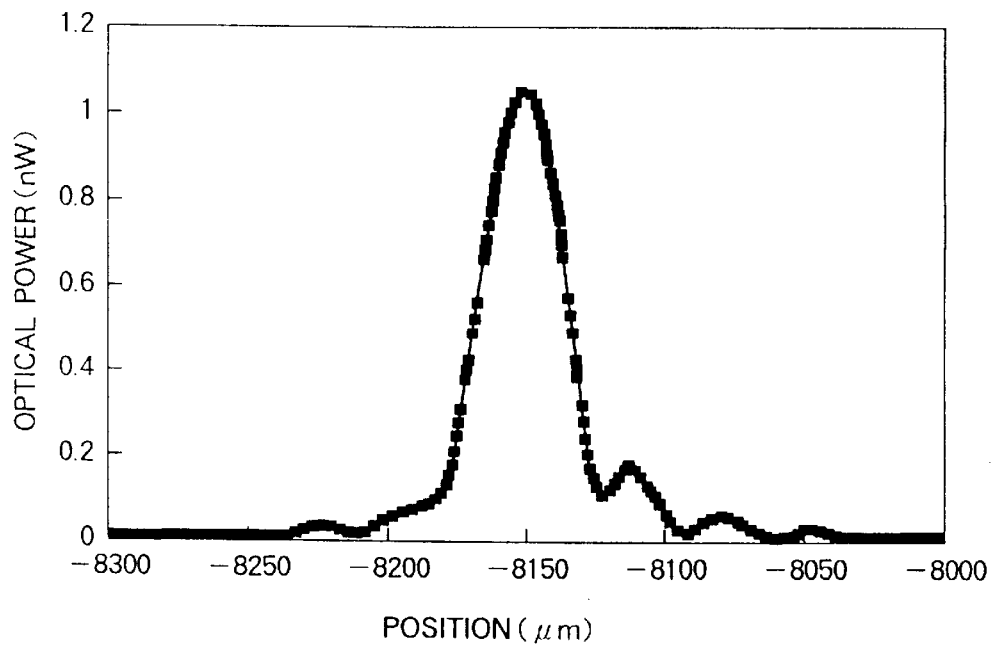
FIG. 7 is a graph of the intensity profile of the ultraviolet beam in the first embodiment.

FIG. 7 shows an intensity profile of the ultraviolet beam $P_1$ incident on the phase mask 10. Position on the Y-axis is indicated in micrometers on the horizontal axis, and optical power in nanowatts on the vertical axis. The beam has a substantially Gaussian profile, with a full width of about one hundred micrometers (100 $\mu$m). The diffracted ultraviolet beam $P_2$ incident on the photosensitive optical fiber 12 has a similar profile.

Ultraviolet illumination causes the core of the photosensitive optical fiber 12 to fluoresce, emitting visible light in the 400-nm wavelength vicinity. Some of this visible light propagates through the photosensitive optical fiber 12 to the optical transducer 34.

Figure 8:
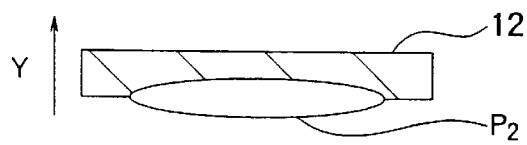
FIG. 8 is a plan view of the photosensitive optical fiber, illustrating incorrect beam alignment.
Figure 9:
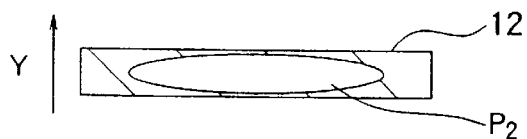
FIG. 9 is a plan view of the photosensitive optical fiber, illustrating correct beam alignment.
Figure 10:
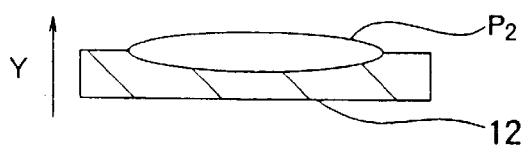
FIG. 10 is a plan view of the photosensitive optical fiber, illustrating incorrect beam alignment.

Referring to FIGS. 8, 9, and 10, the diffracted ultraviolet beam $P_2$ has an elliptical cross section, the one-hundred-micrometer beam width being the minor axis of the ellipse. The width of the photosensitive optical fiber 12 is slightly greater.

In FIG. 8, the photosensitive optical fiber 12 is misaligned in the positive Y-axis direction. In this misaligned state, a displacement of even a few micrometers in the Y-axis direction makes a great difference in the amount of ultraviolet illumination received by the fiber core, as can be seen from the beam profile in FIG. 7. The vibration of the photosensitive optical fiber 12 by the Y-axis vibrating stage 28 therefore leads to a large oscillation in the intensity of the fluorescence produced in the fiber, and a strong ac component in the electrical signal output by the optical transducer 34. The amplified ac component exceeds the positive threshold employed in the threshold comparator 50 each time the fiber is moved in the negative Y-axis direction, toward the center of the beam.

In FIG. 9, the photosensitive optical fiber 12 is centered directly under the diffracted ultraviolet beam $P_2$. The vibration imparted by the Y-axis vibrating stage 28 does not greatly change the amount of ultraviolet illumination received by the photosensitive optical fiber 12, so the intensity of the fluorescence oscillates only slightly, and the output of the optical transducer 34 has only a weak ac component. The amplified ac component fails to reach the positive threshold employed in the threshold comparator 50.

FIG. 10 is similar to FIG. 8, with the photosensitive optical fiber 12 now misaligned in the negative Y-axis direction. The amplified ac component exceeds the positive threshold in the threshold comparator 50 when the photosensitive optical fiber 12 is moved in the positive Y-axis direction, toward the beam center.

Figure 11:
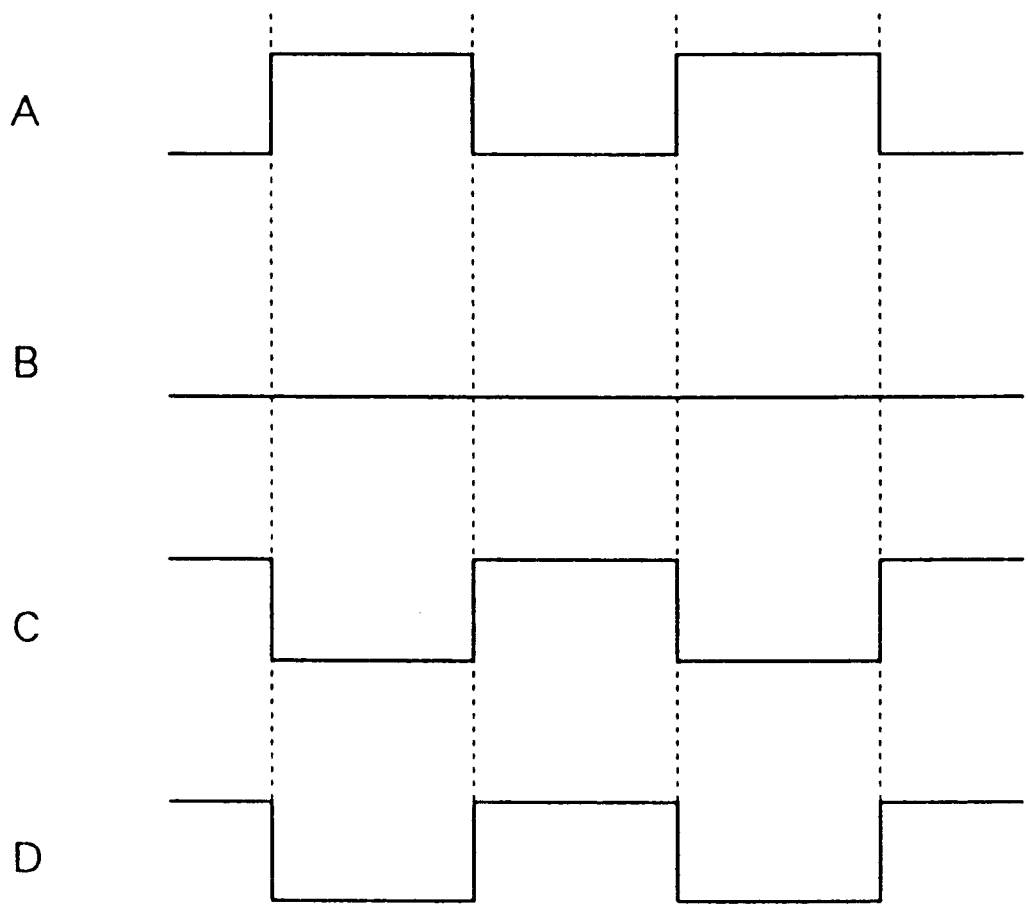
FIG. 11 is a waveform diagram illustrating waveforms produced by the alignments in FIGS. 9, 10, and 11.

FIG. 11 shows waveforms of signals occurring in the control circuit in FIG. 6. Waveform D is the dither signal output by the dither signal generator 56. The Y-axis vibrating stage 28 moves in the positive Y-axis direction when the dither signal is high, and in the negative Y-axis direction when the dither signal is low. Waveforms A, B, and C are examples of the binary signal output by the threshold comparator 50 when the photosensitive optical fiber 12 is in positive misalignment, correct alignment, and negative misalignment, respectively.

When the photosensitive optical fiber 12 is in negative misalignment, as in FIG. 10, if the misalignment is great enough to send the amplified ac component of the output of the optical transducer 34 over the threshold in the threshold comparator 50, then the binary signal has a waveform generally similar to waveform C in FIG. 11, with substantially the same phase as the dither signal D. The phase-comparison signal output by the phase comparator 52 causes the offset signal generator 58 to increase the dc offset voltage added to the dither signal by the summing circuit 60. The stage driving circuit 62 responds by moving the center of vibration of the Y-axis vibrating stage 28 in the positive Y-axis direction, correcting the misalignment. This process continues until the amplified ac component no longer reaches the threshold, at which point the photosensitive optical fiber 12 is close to the correct alignment shown in FIG. 9.

When the photosensitive optical fiber 12 is correctly aligned, or when the alignment is nearly enough correct for the amplified ac component to remain below the threshold in the threshold comparator 50, the output of the threshold comparator 50 remains low (waveform B in FIG. 11). The phase-comparison signal output by the threshold comparator 50 indicates neither that the binary signal and the dither signal have the same phase, nor that they have mutually reverse phases. For example, the phase-comparison signal has a duty cycle of fifty percent. The output of the offset signal generator 58 is accordingly held constant, and the alignment remains unchanged.

When the photosensitive optical fiber 12 is in positive misalignment, as in FIG. 8, if the misalignment is great enough to send the amplified ac component over the threshold in the threshold comparator 50, then the binary signal has a waveform generally similar to waveform A in FIG. 11, opposite in phase to the dither signal D. The phase-comparison signal output by the phase comparator 52 causes the offset signal generator 58 to decrease the dc offset voltage added to the dither signal by the summing circuit 60. The stage driving circuit 62 responds by moving the center of vibration of the Y-axis vibrating stage 28 in the negative Y-axis direction, correcting the misalignment. This process continues until the amplified ac component no longer exceeds the positive threshold and the alignment is correct, or nearly correct.

The positive threshold employed in the threshold comparator 50 sets an alignment tolerance of the phase comparator 52, a constant low waveform being produced when the alignment is within the tolerance, and a waveform such as waveform A or C in FIG. 11 being produced when the alignment is out of tolerance. The appropriate threshold can be determined from the alignment requirements, which are related to the frequency and magnitude of vibration of the Y-axis vibrating stage 28, as well as to the beam dimensions.

Compared with the prior art, which attempts to maximize the dc level of the electrical signal output by the optical transducer 34, the first embodiment responds to the phase of the electrical signal. When alignment drifts out of tolerance, the phase of the electrical signal immediately indicates the direction in which the photosensitive optical fiber 12 should be moved to correct the misalignment. The simple control circuit shown in FIG. 6 is accordingly able to respond quickly and appropriately to alignment drift, and to maintain highly accurate alignment without unnecessary wandering. Alignment is moreover maintained despite natural variations in the level of the fluorescence and changes in the scanning speed, as these factors do not affect the phase of the electrical signal.

The alignment accuracy is also independent of the beam size and the length of the scan. The first embodiment permits the use of a tightly focused and therefore intense beam during long scans, with resultant gains in manufacturing efficiency.

As a variation of the first embodiment, the control system in FIG. 6 can be modified to correct misalignment by controlling the Y-axis translational stage 24 as well as the Y-axis vibrating stage 28. Arbitrarily large misalignments can be corrected in this way, relaxing the need for exactness in the initial alignment of the θ-axis rotational stage 26. The variable displacement range of the Y-axis vibrating stage 28 can also be reduced, from one hundred micrometers to about fifteen micrometers (15 $\mu$m), for example.

Next, a second embodiment will be described.

Figure 12:
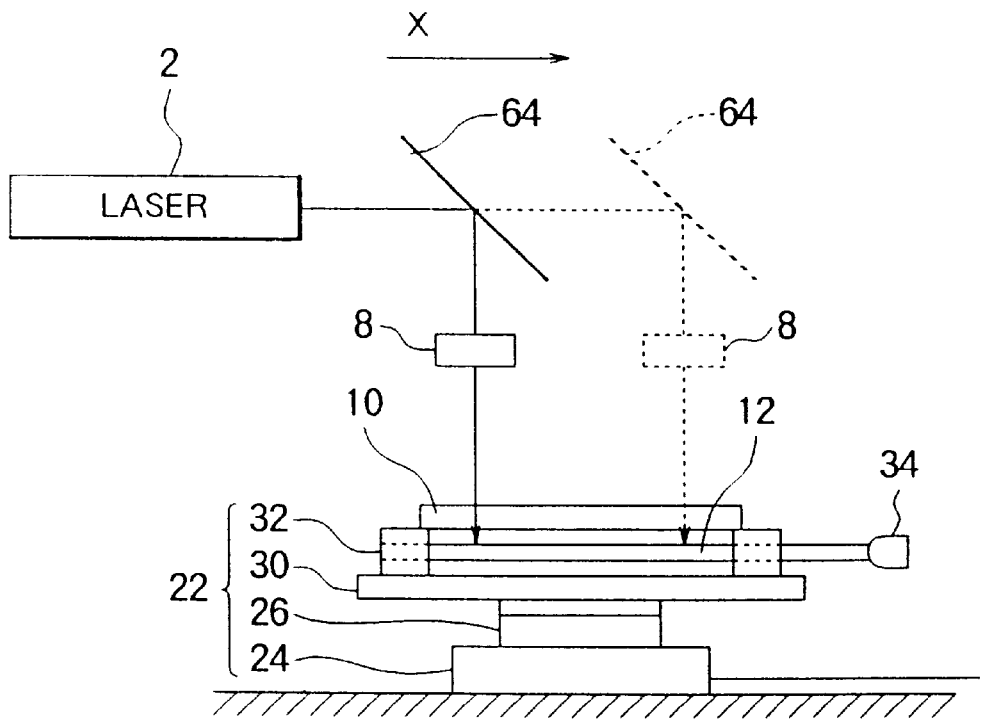
FIG. 12 is a side view illustrating mechanical components of an alignment system according to a second embodiment of the invention.
Figure 13:
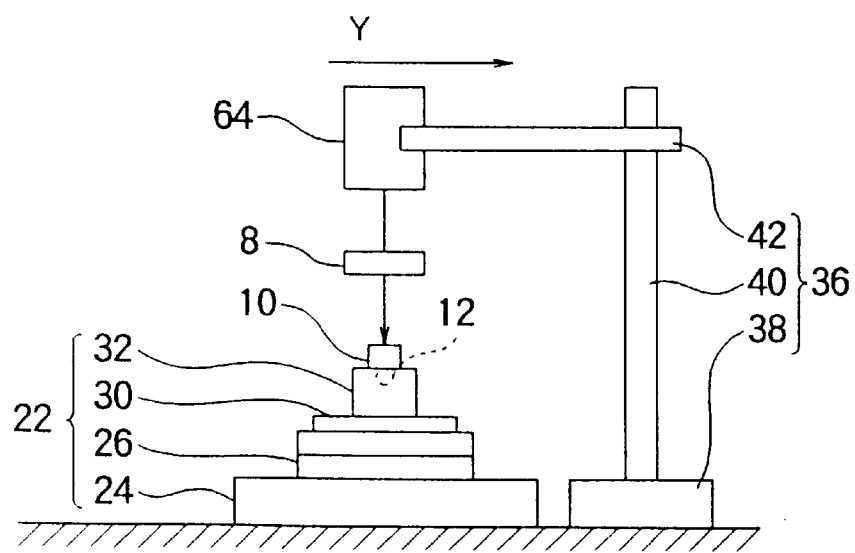
FIG. 13 is a frontal view illustrating the mechanical components in the second embodiment.

The mechanical components of the second embodiment are shown in side view in FIG. 12 and frontal view in FIG. 13, using the same reference numerals as in FIGS. 4 and 5 for components common to the first embodiment. The differences from the first embodiment are that in the second embodiment, the Y-θ stage assembly 22 has no Y-axis vibrating stage, and the mirror of the first embodiment is replaced by a tilting mirror 64 having a piezoelectrically actuated mounting, such as the PHS 1z NV-102 tilting mirror mount manufactured by Piezosystem Jena of Jena, Germany.

Figure 14:
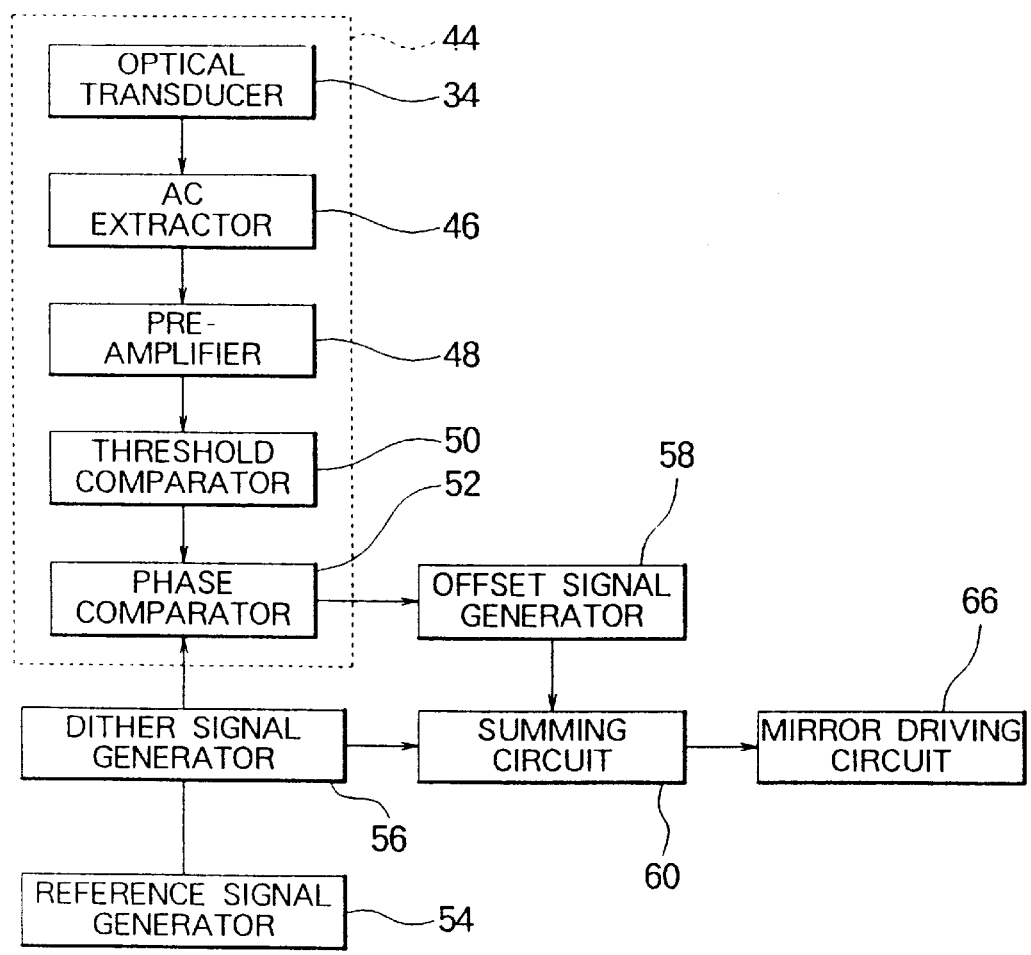
FIG. 14 is a block diagram of the control circuit in the second embodiment.

FIG. 14 shows the alignment control circuit of the second embodiment, using the same reference numerals as in FIG. 6 for elements common to the first embodiment. The difference from the first embodiment is that the compensation signal output by the summing circuit 60 is supplied to a mirror driving circuit 66 which is configured to drive the tilting mirror 64, thereby tilting the ultraviolet beam $P_1$ in the Y-axis direction, as indicated by the arrow in FIG. 13. The tilting motion is oscillatory, similar to the vibration in the first embodiment. The ultraviolet beam $P_1$ oscillates around a center angle determined by the dc component of the compensation signal. The variable range of the tilt is sufficient to move the landing point of the ultraviolet beam $P_1$ on the phase mask 10 by at least, for example, one hundred micrometers (100 µm). The oscillations are smaller, moving the landing point by only a few micrometers.

The operation of the second embodiment is similar to the operation of the first embodiment. After initial alignment, the control system in FIG. 14 is turned on and begins vibrating the tilting mirror 64. Next, the scanning process begins, the ultraviolet beam $P_1$ moving in the X-axis direction while oscillating in the Y-axis direction as described above. As in the first embodiment, the oscillations produce an ac component in the electrical signal output by the optical transducer 34, the ac component being weak when the photosensitive optical fiber 12 and diffracted ultraviolet beam $P_2$ are correctly aligned, and becoming stronger if the beam begins to drift out of alignment. When the ac component reaches a threshold level, the threshold comparator 50 produces a binary signal with a phase that indicates the direction in which the beam needs to be moved to restore correct alignment, and the phase comparator 52 outputs a phase-comparison signal that causes the offset signal generator 58 to alter the dc offset voltage added to the dither signal, so as to move the beam in the necessary direction. The waveforms of the binary signal and dither signal are similar to the waveforms in the first embodiment, illustrated in FIG. 11.

The second embodiment provides the same advantages as the first embodiment, enabling accurate alignment to be maintained regardless of the dimensions of the beam and the length of the scan. A further advantage of the second embodiment is that a small angular displacement of the tilting mirror 64 can produce a large displacement of the beam landing position. Large drifts in alignment can therefore be corrected more easily than in the first embodiment.

As in the first embodiment, the alignment control system can also be modified to correct large misalignments by controlling the Y-axis translational stage 24, in which case the variable tilting range of the tilting mirror 64 can be reduced.

To review the operation of the two embodiments, both have an X-axis translation stage 38, a Y-axis translational stage 24, and a θ-axis rotational stage 26, as illustrated in FIGS. 4, 5, 12, and 13. When the in-fiber Bragg grating is manufactured, the optical fiber 12 is secured in the pair of fiber holders 32, which are then placed on the base plate 30. Initial alignment is carried out by use of the X-axis translation stage 38, Y-axis translational stage 24, and θ-axis rotational stage 26. During initial alignment, the Y-axis vibrating stage 28, in the first embodiment, or the tilting mirror 64, in the second embodiment, is set at a neutral position. After initial alignment, the X-axis translational stage 38 is driven, the Y-axis vibrating stage 28 or tilting mirror 64 is driven, and the relative positions of the optical fiber 12 and ultraviolet beam are aligned continuously as the fiber grating is formed.

In the embodiments, the X-axis motion and Y-axis vibration were described as being mutually perpendicular. In this invention, however, while the X-axis translational stage 38 is driven to form a fiber grating of the desired length, the Y-axis vibrating stage 28 or tilting mirror 64 is vibrated simultaneously. As a result, the trace of the ultraviolet beam does not cross the optical fiber 12 at exactly a right angle to the fiber axis. The actual angle depends on the speed of vibration of the Y-axis vibrating stage 28 or tilting mirror 64, and the driving rate of the X-axis translational stage.

The alignment system measures the intensity of the natural fluorescence produced when the ultraviolet beam illuminates the fiber core, maximum fluorescence being obtained when the peak of the beam intensity profile is centered on the axis of the fiber core. For this purpose it is not necessary for the trace of the ultraviolet beam to be perpendicular to the X-axis. The fiber core will fluoresce if the ultraviolet beam crosses the fiber at any angle. The vibration thus need not be perpendicular to the X-axis. It is only necessary for the fluorescence intensity to yield a binary signal when compared with a predetermined threshold by the threshold comparator 50. This depends on the power distribution characteristic of the laser light source 2, the stroke length of the vibration, the gain of the preamplifier 48, and the threshold value employed in the threshold comparator 50.

Various other modifications can be made in the preceding embodiments. For example, if the base plate 30 is coated so as to prevent reflection of ultraviolet light, the photosensitive optical fiber 12 can be held in contact with the base plate 30 instead of being suspended in midair.

The cylindrical lens 8 can be replaced by another type of lens, or by other aperture control means.

The laser light source, optical transducer, and tilting mirror mount are not limited to the specific devices mentioned in the preceding description.

A bandpass filter that passes the dither signal frequency, but attenuates a frequency twice as high as the dither signal frequency, can be used as the ac extractor 46. This enables the threshold of the threshold comparator 50 to be reduced, because the frequency of the ac component of the output of the optical transducer 34 is equal to the dither signal frequency when the photosensitive optical fiber and ultraviolet beam are misaligned as in FIG. 8 or 10, but is equal to twice the dither signal frequency when the alignment is correct as in FIG. 9.

Those skilled in the art will recognize that further variations are possible within the scope claimed below.

What is claimed is:

1. An alignment system for maintaining correct alignment between a photosensitive optical fiber and an ultraviolet beam illuminating the photosensitive optical fiber through a phase mask, while the ultraviolet beam is scanned along the photosensitive optical fiber in a first direction to create an optical filter in the photosensitive optical fiber, comprising:

a positional transducer causing an oscillation in relative position between said photosensitive optical fiber and said ultraviolet beam in a second direction differing from said first direction;

an optical transducer coupled to an end of said photosensitive optical fiber, receiving from said photosensitive optical fiber light produced by fluorescence in said photosensitive optical fiber when said photosensitive optical fiber is illuminated by said ultraviolet beam, and converting said light to a first signal, said first signal having an oscillating component due to said oscillation in relative position; and a control circuit coupled to said optical transducer, comparing phases of said first signal and said oscillation in relative position, and adjusting the relative position of said photosensitive optical fiber and said ultraviolet beam in said second direction according to a phase relationship between said first signal and said oscillation in relative position.

2. The alignment system of claim 1, wherein said second direction is substantially perpendicular to said first direction.

3. The alignment system of claim 1, wherein said positional transducer comprises a vibrating stage causing said photosensitive optical fiber to vibrate in said second direction.

4. The alignment system of claim 3, wherein said vibrating stage is piezoelectrically actuated.

5. The alignment system of claim 1, wherein said positional transducer comprises a tilting mirror reflecting said ultraviolet beam toward said photosensitive optical fiber, said tilting mirror being tilted in an oscillating manner, thereby causing said ultraviolet beam to oscillate in said second direction.

6. The alignment system of claim 5, wherein said tilting mirror is piezoelectrically actuated.

7. The alignment system of claim 1, wherein said control circuit comprises:

a signal generator generating a second signal that oscillates and is furnished to said positional transducer to produce said oscillation in relative position;

a signal extractor extracting the oscillating component of said first signal;

a threshold comparator comparing the oscillating component of said first signal with a threshold, thereby generating a binary signal; and a phase comparator comparing said binary signal with said second signal, and generating a phase-comparison signal indicating a phase relationship between said binary signal and said second signal;

said control circuit adjusting said relative position in one sense of said second direction when said phase-comparison signal indicates that said binary signal is in phase with said second signal, and adjusting said relative position in an opposite sense of said second direction when said phase-comparison signal indicates that said binary signal and said second signal have mutually reverse phases.

8. The alignment system of claim 7, wherein said control circuit further comprises:

an offset signal generator receiving said phase-comparison signal, generating an offset signal, and altering said offset signal according to said phase-comparison signal; and a summing circuit adding said offset signal to said second signal, thereby adjusting said relative position by controlling a center position of said oscillation.

9. The alignment system of claim 7, wherein said threshold corresponds to an alignment tolerance of said relative position.

10. A method of maintaining correct alignment between a photosensitive optical fiber and an ultraviolet beam illuminating the photosensitive optical fiber through a phase mask, while the ultraviolet beam is scanned along the photosensitive optical fiber in a first direction to create an optical filter in the photosensitive optical fiber, comprising the steps of:

producing an oscillation in relative position between said photosensitive optical fiber and said ultraviolet beam in a second direction differing from said first direction;

detecting light produced by fluorescence in said photosensitive optical fiber when said photosensitive optical fiber is illuminated by said ultraviolet beam;

converting said light to a first signal having an oscillating component due to said oscillation in relative position;

detecting a phase relationship between said first signal and said oscillation in relative position; and adjusting the relative position of said photosensitive optical fiber and said ultraviolet beam in said second direction according to said phase relationship.

11. The method of claim 10, wherein said second direction is substantially perpendicular to said first direction.

12. The method of claim 10, wherein said step of producing said oscillation in relative position comprises causing said photosensitive optical fiber to vibrate in said second direction.

13. The method of claim 12, wherein said step of producing said oscillation in relative position comprises actuating a piezoelectric transducer.

14. The method of claim 10, wherein said step of producing said oscillation in relative position comprises tilting a mirror that reflects said ultraviolet beam toward said photosensitive optical fiber, causing said ultraviolet beam to oscillate in said second direction.

15. The method of claim 14, wherein said step of producing said oscillation in relative position comprises piezoelectrically actuating said mirror.

16. The method of claim 10, further comprising the steps of:

generating a second signal having an oscillating component;

furnishing said second signal to a positional transducer, thereby producing said oscillation in relative position;

extracting the oscillating component of said first signal;

comparing the oscillating component of said first signal with a threshold, thereby generating a binary signal;

comparing said binary signal with said second signal, thereby determining said phase relationship;

adjusting said relative position in one sense of said second direction when said binary signal is in phase with said second signal;

adjusting said relative position in an opposite sense of said second direction when said binary signal and said second signal have mutually reverse phases; and leaving said relative position unchanged when the oscillating component of said first signal fails to reach said threshold and said binary signal accordingly remains constant.

17. The method of claim 16, further comprising the steps of:

generating an offset signal;

altering said offset signal in one direction when said binary signal is in phase with said second signal;

altering said offset signal in an opposite direction when said binary signal and said second signal have mutually reverse phases; and adding said offset signal to said second signal, thereby adjusting said relative position by controlling a center position of said oscillation.

18. The method of claim 16, wherein said threshold corresponds to an alignment tolerance of said relative position.

* * * * *